United States Patent [19]

Loiseau

[11] 4,264,020
[45] Apr. 28, 1981

[54] MANUAL DISPENSER FOR PASTY MATERIAL HELD IN A RESERVOIR UNDER PRESSURE

[75] Inventor: Jacques Loiseau, L'Etang la Ville, France

[73] Assignee: Compagnie des Metaux Precieux, Paris, France

[21] Appl. No.: 898,843

[22] Filed: Apr. 20, 1978

[30] Foreign Application Priority Data

Apr. 26, 1977 [FR] France ................................ 77 12541

[51] Int. Cl.³ .............................................. G01F 11/38
[52] U.S. Cl. ................................ 222/207; 137/614.14; 222/214; 222/452; 251/7
[58] Field of Search ................ 222/207, 211–215, 222/448, 449, 450, 451, 452, 476, 508; 137/614.13, 614.14; 251/6, 7

[56] References Cited

U.S. PATENT DOCUMENTS

| 2,673,011 | 3/1954 | Rood et al. .................... 222/450 X |
| 2,895,653 | 7/1959 | Gzepen ............................ 222/452 |
| 3,212,671 | 10/1965 | Rock ............................... 222/450 X |
| 3,308,898 | 3/1967 | Allen et al. ..................... 222/214 X |
| 3,550,861 | 12/1970 | Teson .................................. 251/6 X |
| 3,982,724 | 9/1976 | Citrin .................................... 251/7 |
| 4,095,722 | 6/1978 | Miller .............................. 222/214 X |
| 4,121,584 | 10/1978 | Turner et al. ................... 222/450 X |

FOREIGN PATENT DOCUMENTS 2212768   7/1974   France .

Primary Examiner—Robert J. Spar
Assistant Examiner—Fred A. Silverberg
Attorney, Agent, or Firm—Haseltine and Lake

[57] ABSTRACT

A manual dispenser for a pasty product having a reservoir for the product and in which the product is maintained under pressure, an intermediate chamber connected to the reservoir and a discharge nozzle, and an assembly for causing the intermediate chamber to connect alternatively with the reservoir, for filling the chamber, and the discharge nozzle, for discharging a predetermined quantity of product from the nozzle is described.

1 Claim, 10 Drawing Figures

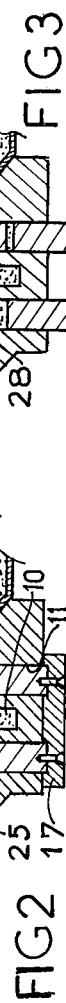
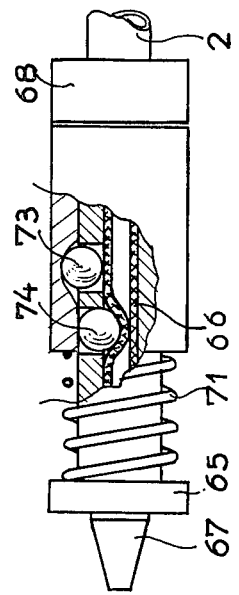
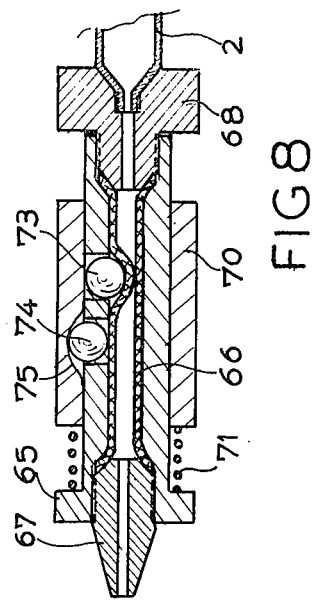
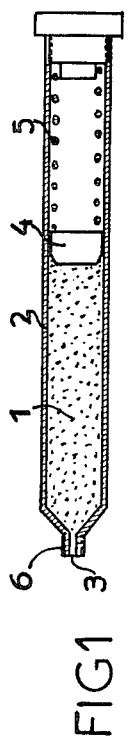
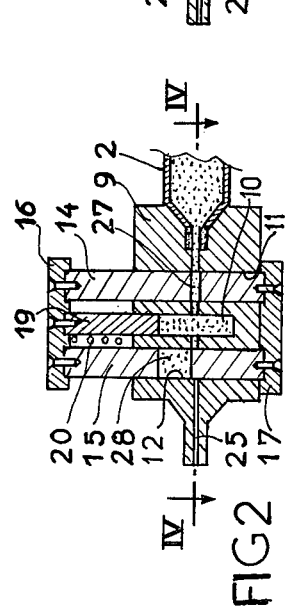
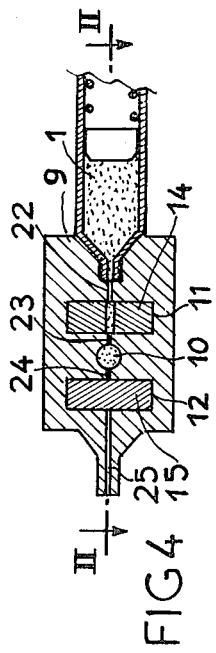
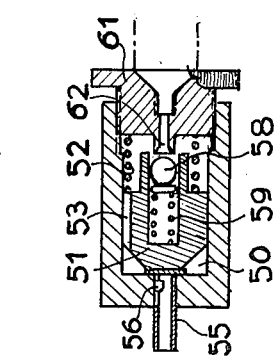

MANUAL DISPENSER FOR PASTY MATERIAL HELD IN A RESERVOIR UNDER PRESSURE

The present invention relates to a manual dispenser for pasty products and more particularly a dispenser for dispensing constant and reproducible volumes of product. It is applicable to the dispensing of pastes such as glues or brazing pastes or abrasive pastes, for producing spot bonds.

Numerous dispensing devices such, for example, as syringes with which pressure is applied manually or pneumatically by means of a plunger, are known at the present time. However, such devices do not make it possible to meter accurately the volume of paste dispensed. It is also known to use devices with pressure applied to the plunger by means of a nut and screw unit, or rack and pinion unit. French Pat. No. 2,212,618 describes, for example, a device which makes it possible to displace the plunger over a defined length and in theory to discharge the volume of paste corresponding to the volume displaced by the plunger. Nevertheless, it is found in practice that the volume of paste deposited is either greater or less than the theoretical volume, because all pastes are compressible and because the paste continues to flow, whilst expanding, after the plunger has stopped moving.

Devices have also been proposed in which the pressure on the plunger is provided by a constant volume of gas under constant pressure. After each expulsion, the chamber containing this gas is brought back to atmospheric pressure. It is thus possible to deposit defined amounts of pastes, but to ensure constant metering it is essential to use a paste of strictly constant viscosity, which is rarely the case because, in particular, of the variations in viscosity due to the variations in temperature.

It has also been proposed to use a device in which a reservoir under pressure, containing the paste, is connected to a chamber equipped with a retractable needle valve which opens and closes the orifice of a dispensing nozzle. At each opening of the needle valve, the paste flows through the orifice and the volume of paste dispensed depends on the time for which the needle valve is open, the viscosity of the paste and the pressure exerted on the latter. Hence, the same disadvantage is encountered as for the preceding devices if the viscosity of the paste varies, so that it is difficult to deposit precisely volumes less than, for example, 10 mm³.

Finally, the last two devices described required the use of compressed gas, which is not always available in small workshops.

It is an object of the present invention to avoid the disadvantages of the known devices and in particular to escape the consequences of a variation in viscosity of the paste.

According to the invention there is provided a manual dispenser for dispensing a pasty product comprising:
a reservoir for the pasty product;
means for maintaining the product when in the reservoir under pressure;
means defining an intermediate chamber;
discharge means;
means for connecting said reservoir to said intermediate chamber and said intermediate chamber to said discharge means; and
means for causing said intermediate chamber to communicate alternatively with said reservoir and said discharge means.

Said intermediate chamber may be defined by a flexible tube which connects said reservoir to said discharge means, and means for closing said flexible tube selectively and alternately at an upstream point and a downstream point, be deformation of said tube comprising transversely acting means, e.g. balls or plungers.

The invention will be more fully understood from the following description of embodiments thereof, given by way of example only, with reference to the accompanying drawings.

In the drawings:

FIG. 1 is a longitudinal section through an embodiment of a paste reservoir for use in a dispenser according to the present invention;

FIG. 2 is an axial section through an embodiment of a dispenser according to the present invention and on the line II—II of FIG. 4;

FIG. 3 is a view similar to that of FIG. 2, but showing the dispenser of FIG. 2 in its alternative condition;

FIG. 4 is an axial section along the line IV—IV of FIG. 2;

FIGS. 5 and 6 are axial sections through other embodiments of a dispenser according to the present invention;

FIG. 7 is an external view, partially in section, of a further embodiment of a dispenser according to the invention;

FIG. 8 is a longitudinal section through the dispenser of FIG. 7 but showing it in an alternative condition;

Figure 9:
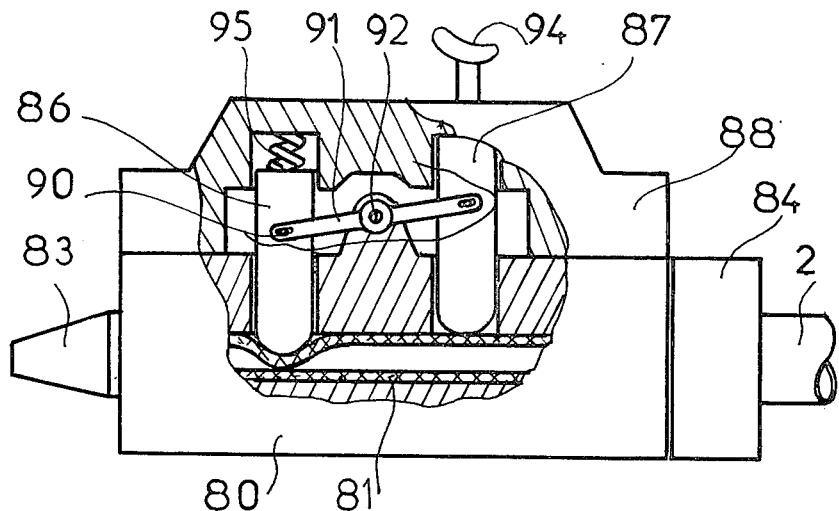
FIG. 9 is an external view, partially in section, of a further embodiment of a dispensing according to the present invention.

Referring first to FIG. 1, a reserve 1 of paste is stored in a reservoir tube 2, in which the paste is pushed towards an outlet channel or nozzle 3 by a plunger 4, which is pushed by a spring 5. The nozzle 3 of the reservoir 2 is, as shown, threaded at 6 for attachment to the body of a dispenser, as will be apparent from the subsequent figures. It will be appreciated that the threaded attachment of the reservoir to the dispenser is given simply by way of example and can be replaced by any other known conventional attachment means.

Reference will now be made to FIGS. 2, 3 and 4, in which the reservoir 2 screwed on to the body 9 of a dispenser is shown. The body 9 comprises a central cylindrical chamber 10 forming an intermediate chamber of the dispenser and open at one of its ends only, and two apertures 11 and 12 which extend through the body from side to side. Slides 14 and 15 engage respectively in the apertures 11 and 12, and are joined, at each of their ends, by plates 16 and 17 which form actuators. The actuator 16 also supports a plunger 19 which engages in the chamber 10, and serves as a support for a spring 20 located between the actuator 16 and the body 9. The body 9 further has a channel 22 which connects the reservoir to the aperture 11, as well as a channel 23 between the aperture 11 and the chamber 10, a channel 24 between the chamber 10 and the aperture 12 and, finally, a channel 25 which forms the discharge nozzle. Furthermore, channels 27 and 28 are provided extending transversely through the slides 14 and 15 respectively.

It will be seen that in the rest position or filling position, shown in FIG. 2, the spring 20 holds the movable assembly of the slides 14, 15 and plunger 19 in the pushed-up positioned, with the actuator 17 forming a stop. In this position, the channel 27 connects the channels 22 and 23, so that the paste 1 can fill the chamber 10. On the other hand, the channel 28 in slide 15 is staggered relative to the channels 24 and 25 so that the slide 15 prevents the paste from issuing externally.

It is seen that when the actuator 16 is pressed, thereby compressing the spring 20, communication between the channels 22 and 23 is immediately cut and communication between the chamber 10 and the nozzle 25 via the channels 24 and 28 is established. In this operation, the plunger 19 has gradually entered the chamber 10, and driven an equivalent volume of paste towards the discharge channel 25. When the pressure exerted on the actuator 16 is released, the spring 20 returns the assembly to the position in FIG. 2, again closes communication between the discharge channels, and reestablishes communication between the channels for feed from the reservoir 2, which makes it possible to refill the chamber 10.

It will be noted that the volume of paste deposited is solely a function of the cross-section of the plunger 19 and of its stroke between the filling position and the position at the end of its dispensing stroke. The cross-sections of the various channels in the dispenser body or in the slides are selected in accordance with the viscosity of the product to be dispensed.

In order to permit the first filling of the chamber 10, a small purging channel may be provided, which makes it possible to discharge the air initially contained in the chamber; this channel can subsequently be reclosed, or can even be left open where the product handled is of high viscosity, because in that case the pressure loss in this fine purging channel would be sufficient to avoid any leakage of the product.

In the embodiment shown in FIG. 5, the intermediate chamber 41 is defined by a hollow movable plunger 30 which slides in a seat 31 in the body of the dispenser. The plunger 30 is normally brought into its upper position as shown in FIG. 5 by a spring 32 which bears on a small ring 33. The plunger 30 accommodates a second plunger 35, the normal position of which relative to the plunger 30 is ensured by a spring 36 located between the small ring 33 and an adjustable nut 37. In the rest position, which is the filling position, shown in FIG. 5 vents 39 in the wall of the plunger 30 are aligned with a channel 40 connected to the reservoir so that the reservoir is in communication with the chamber 31. In this position, paste fills the chamber 41 but it cannot escape from this chamber. In order to dispense the metered amount of paste, pressure is exerted on the head 42 of the plunger 35. In a first stage, because the spring 36 is arranged to be stiffer than the spring 32, the whole assembly descends, in its entirety, in the seat 31. When the assembly reaches the end of its stroke, orifices 39 of the plunger 30 are aligned with a channel 44 which forms the discharge nozzle. If pressure continues to be exerted on the head 42, the plunger 35 moves in the plunger 30 and drives a corresponding volume of paste through the channel 44. The metered amount dispensed is thus a volume equal to the volume displaced by the plunger 35 and this can be adjusted by altering the position of the nut 37.

Referring to the embodiment shown in FIG. 6, the intermediate chamber 50 has slidable therein a sliding plunger 51 which is brought into its rest position by a spring 52. The plunger does not provide a seal between the two parts of the chamber 50 which it separates, because it comprises peripheral cuts such as 53 which permit free communication between the two parts of the chamber. The plunger 51 comes to rest against the flat head of a hollow needle 55 which forms an injection nozzle and which possesses an opening 56 through the wall of the needle. The plunger 51 is provided with an axial seat in which a ball valve 58, maintained in its rest position by a spring 59, slides freely.

The chamber 50 is closed on the reservoir side by a threaded bung 61 which is provided with a seat 62 for the ball 58, and a conical recess for connection to the reservoir.

In the rest position, which is also the filling position, as shown in FIG. 6, the opening 56 of the needle 55 is not free whilst the pressure of the spring 59 is on the ball 58 is less than the pressure of the paste coming from the reservoir. Thus paste can enter the chamber 50 and fill it, without being able to escape externally. In order to deliver a metered amount of paste, the needle 55 is pressed back, which frees the opening 56; at the same time, the pressure of the spring 59 increases and brings the ball 58 on to the seat 62, thus cutting communication between the chamber 50 and the reservoir. Paste flows into the needle 55 through the opening 56 and the volume of paste extruded is equal to the volume of penetration of the needle into the chamber 50, which is determined by the plunger 51 coming into contact with the bung 61. By adjusting the position of the bung 61 in the body of the dispenser it is therefore possible to vary the volume of paste deposited. Of course, the ball valve shown in this embodiment could be replaced by a valve of any other conventional form.

The embodiments of dispensers which have just been described are most suitable for dispensing greases or unctuous pastes. However, they have disadvantages in use with abrasive or corrosive pastes, which interfer with the long-term correct functioning of slide systems. In the case of such products, it is thus preferable to use the embodiments shown in FIGS. 7 and 8, or 9 and 10. In the embodiment of FIGS. 7 and 8, a flexible tube 66 extends longitudinally through the body 65 of the dispenser. The outlet end of the tube 66 is held in the body by a conical part of a discharge nozzle 67 which is screwed into the body of the dispenser. At the other end, the flexible tube 66 is held in the same manner in the body of the dispenser by a nut 68 which carries a conical recess for connection to the reservoir 2. The body 65 of the dispenser is surrounded by a sleeve 70 which is brought into the rest position by a spring 71. Finally, the body of the dispenser comprises two orifices which serve as seats for two balls 73 and 74 which are movable freely in these seats. The sleeve 70 has a seat 75 with a profile matching the diameter of the balls 73 and 74.

In the rest position, which is also the filling position, shown in FIG. 7, the spring 71 pushes the sleeve 70 back until it abuts the nut 68. The ball 74 is pushed by the sleeve 70 towards the flexible tube 66, which it flattens and closes. The ball 73, which is now opposite the seat 75, moves into the seat 75 and so permits the tube 66 to retain its normal shape. Under these conditions, the entire part of the tube 66 located to the right of the ball 74 is in free communication with the reservoir 2 and is filled with paste under pressure. In order to dispense a metered amount of paste, the sleeve 70 is pushed forwards, against the spring 71, so as to bring it into the position shown in FIG. 8. In this position it is the ball 73 which flattens the tube and stops communication with the reservoir, whilst the ball 74, which moves into the seat 75, allows the tube to resume its normal shape. It can be seen here that an intermediate chamber has thus been formed, consisting of the portion of tube between the two balls, and, as in the preceding examples, this intermediate chamber is brought alternately into communication with the reservoir and with the discharge nozzle. It will be seen that by a succession of operations which cause the device to move from the position of FIG. 7 to that of FIG. 8, a volume of paste equal to the volume of the imprint of the ball on the flexible tube will be made to travel forwards at each operation.

It will furthermore be noted that where very viscous pastes are concerned it is not strictly essential that one of the balls should be in the position corresponding to complete closing before the other ball completely release the corresponding passage.

In fact, if the viscosity of the product is sufficient, the loss of pressure in a narrow section will be sufficient to prevent the product from flowing during a transient intermediate period which only very temporarily permits direct communication between the reservoir and the discharge nozzle.

Figure 10:
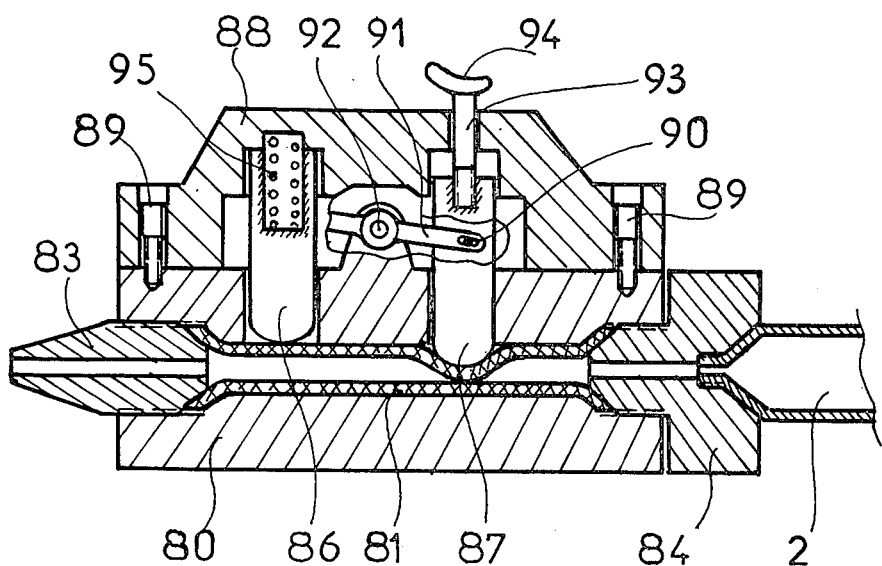
FIG. 10 is a longitudinal section through the dispenser of FIG. 9 but showing it in an alternative condition.

FIGS. 9 and 10 show an embodiment of a dispenser which functions in an equivalent manner to that shown in FIGS. 7 and 8. Here again, a flexible tube 81 extends longitudinally through the body 80 of the dispenser and is held at one end by a discharge nozzle 83 and at the other end by a nut 84 which carries the attachment for connection to the reservoir. The body 80 has two orifices which open out on to the flexible tube, and in which are freely engaged two plungers 86 and 87. The assembly is surmounted by a cover 88 fixed to the body 80 by screws 89. The cover possesses two seats which are opposite those in the body, so that the plungers 86 and 87 are guided both in the body and in the cover. The plungers 86 and 87 are provided with bosses 90 which are engaged in apertures at the end of counteracting connecting rods 91 articulated at their centre 92 on a boss of the body. The strokes of the plungers 86 and 87 are thus always of the same magnitude but in opposite directions. A rod 93 carrying a pushbutton 94, forming an actuator, passes through the cover 88 and is fixed to the plunger 87. A compression spring 95, bearing against the cover and against the plunger 86, tends to keep these two apart.

It will be seen, as has been explained above with reference to FIGS. 7 and 8, that, in the rest position which is also the filling position, shown here in FIG. 9, the spring 95 pushes the plunger 86 towards the flexible tube 81, when it flattens and closes. The plunger 87, pushed upwards by the connecting rod 91, leaves the flexible tube free. The part of the tube 81 located to the right of the plunger 86 is thus in free communication with the reservoir and is filled with paste under pressure. In order to dispense a metered amount of paste, the trigger 94 is pressed, so as to drive the plunger 87 in and flatten and close the tube whilst the plunger 86 becomes disengaged from the tube, against the action of the spring 95, and allows the tube 81 to assume its normal shape. During this operation, a volume of paste equal to the volume of the imprint of the plunger 87 on the flexible tube is transferred to the left, so that, on return to the position of FIG. 9, a fresh volume of paste will be transferred to the left, that is to say, this time, towards the discharge nozzle.

Of course, the invention is not intended to be limited to the embodiments which have been described by way of example only, but also embraces embodiments which only differ therefrom in detail, in different of execution or in the use of equivalent means. Thus, for example, the spring keeping the paste under pressure in the reservoir could be replaced by a charge of gas under pressure.

What is claimed is:

1. A manual dispenser for dispensing a pasty product comprising: a reservoir for the pasty product; means for maintaining the product when in the reservoir under pressure; means defining an intermediate chamber; discharge means; means for connecting said reservoir to said intermediate chamber and said intermediate chamber to said discharge means; and means for causing said intermediate chamber to communicate alternatively with said reservoir and said discharge means, said intermediate chamber being defined by part of a flexible tube connecting said reservoir to said discharge means, and means for closing said flexible tube selectively and alternately at an upstream point and at a downstream point by deformation of said tube comprising transversely movable means, said transversely movable means comprising two plungers which slide in seats and which are connected by counteracting connecting rods arranged so that the strokes of said plungers are equal and opposite; said discharge means comprising a nozzle-shaped outlet channel; spring-actuated plunger means for pushing paste toward said outlet channel; said outlet channel having means for attachment to a dispenser body; said flexible tube extending longitudinally through said dispenser body and being held at one end by said outlet channel and at the other end by means for carrying an attachment for connection to said reservoir; said dispenser body having two orifices opening out onto said flexible tube, said plungers engaging freely in said two orifices; cover means fixed to said dispenser body and having said seats so that said plungers are guided both in the dispenser body and in said cover means; said plungers having bosses engaged in apertures at the end of said counteracting connecting rods, said connecting rods being articulated at their center on a boss of the dispenser body; rods means carrying a push buttom forming an actuator and passing through said cover means and being fixed to one of said plungers; and compression spring means acting against said cover means and against the other one of said plungers for keeping them separated; the volume of pasty product dispensed being equal to the volume of imprint of a plunger on said flexible tube and being variable only by varying the relative shape and size of the plunger and tube.

* * * * *